United States Patent Office

2,849,488
Patented Aug. 26, 1958

2,849,488

ALKYLATION OF UREAS

Joseph C. Ambelang, Akron, and George M. Massie, Cuyahoga Falls, Ohio, assignors to The Firestone Tire & Rubber Company, Akron, Ohio, a corporation of Ohio No Drawing. Application December 30, 1957
Serial No. 705,815

4 Claims. (Cl. 260—553)

This invention relates to an improved process for the alkylation of urea and N-alkylureas by reaction with tertiary olefins.

It is known that ureas may be reacted with tertiary olefins to yield N-alkyl and N,N'-alkylureas. The reaction is usually carried out in a medium comprising concentrated sulfuric acid or oleum, and proceeds to the formation of the N- or N,N'-alkylated ureas. The process as heretofore practiced has the disadvantages of (1) relatively low yield, particularly of the preferred N,N'-alkylated ureas, (2) extremely high viscosity of the reaction mixture, which renders agitation and contact of reagents extremely difficult and (3) the variable character of the reaction, which renders difficult the duplication of results.

Accordingly, it is an object of this invention to provide a novel and improved process for the alkylation of ureas.

Another object is to provide such a process which will utilize a high proportion of the urea supplied to the process.

A further object is to increase the proportion of N,N'-alkylated ureas relative to the N-alkylated ureas produced by the process.

Another object is to provide such a process in which the reaction medium remains sufficiently flowable for ready and complete agitation and contact of the reagents.

Still another object is to provide such a process which will be characterized by consistent and reproducible results in successive runs.

SYNOPSIS OF THE INVENTION

The above and other objects are secured, in accordance with this invention, in a process which comprises contacting urea or an N-alkylated urea with an isoolefin in a reaction mass comprising, at the outset.

Table I

| | Moles |
|---|---|
| (A) The urea to be alkylated | 1 |
| (B) Sulfuric acid or oleum (varying in strength from 80% sulfuric acid to 60% oleum) | 1–3 |
| (C) Sulfur dioxide | 0.5–4.0 |

The reaction is carried out at temperatures in the range −40° C. to +5° C., preferably −25° to −15° C. The reaction mass remains fluid and homogeneous throughout the reaction, which greatly facilitates the agitation and contact of the reactants. Excellent yields, predominately of the preferred N,N'-alkylated ureas, are obtained.

THE REACTION MEDIUM

Referring to the schedule of proportions set out in Table I, a highly important variable is the ratio of moles of sulfuric acid or oleum per mole of the urea; any substantial departure from the indicated range of 1–3 moles of sulfuric acid or oleum will result in greatly reduced yields. Within the indicated range the optimum mole ratio for sulfuric acid:urea is about 2:1 to 2.5:1. As noted, constituent (B) may be supplied either as sulfuric acid or oleum, which grade continuously into each other, depending on the total amount of the elements of water either chemically bound in the acid, or physically dissolved therewith. The moles of constituent (B) specified in the schedule refer to moles of the elements of $SO_3$ (both free and combined as $H_2SO_4$) contained therein, and does not include the elements of water. In general, the total amount of water in the system, including that combined in the sulfuric acid, should be such that the water, and sulfuric acid or oleum components of the mixture, should have a net composition ranging from 80% sulfuric acid to 60% oleum. The influence of the mole ratio of sulfur dioxide to urea is less critical, and may vary from 0.5–4.0 moles of sulfur dioxide per mole of the urea, with an optimum of about 1.1–1.6 moles of sulfur dioxide per mole of the urea. Compositions low in sulfur dioxide tend to be viscous; compositions high in sulfur dioxide tend to lower yields of N,N'-alkylated products relative to N-alkylated products.

THE UREAS EMPLOYED

The process of this invention may be applied to urea itself, or to N-alkylureas. Urea itself is alkylated either to the N-alkyl or the N,N'-alkylurea according to the equations (1) 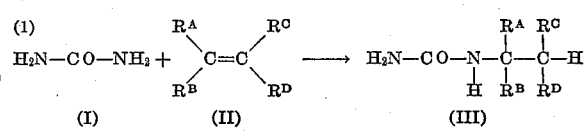

or (2) 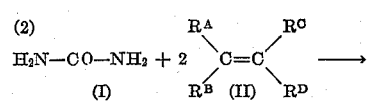

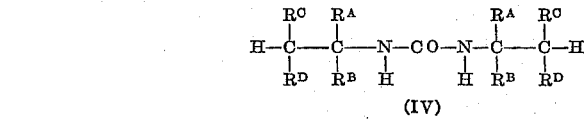

(IV)

wherein $R^A$ and $R^B$ each represents an alkyl group of from 1 to 6 carbon atoms, and $R^C$ and $R^D$ each represents hydrogen or a methyl group, with the proviso that the tertiary olefin (II) shall contain from 4 to 10 carbon atoms. It will also be understood that the radicals $R^A$ and $R^C$ may be joined to form, with the C=C group, a cyclic structure. If the reaction mass contains a urea (either from the feedstock or from reaction (1)) which is already either mono- or di-alkylated on one of its nitrogen atoms, this will be further alkylated to a greater or less extent, depending on the time of contact, to an N,N'-alkylated product according to the reaction:

(3)
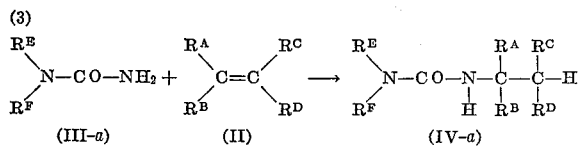
(III-a)   (II)   (IV-a)

wherein $R^E$ represents hydrogen or an alkyl group of from 1 to 10 carbon atoms, and $R^F$ represents an alkyl group of from 1 to 10 carbon atoms. It is possible that Equation 2 represents the end result of Equations 1 and 3 occurring sequentially.

Referring to the N-alkylureas which may form part or all of the feedstock used in this invention, these include for instance N-t-butylurea, N-t-amylurea, N-ethylurea, N-methylurea, N-isopropylurea, N,N-dimethylurea, N,N-diethylurea, N-methyl-N-ethylurea, N-n-propylurea, N-sec-butylurea, and N-n-butylurea.

THE TERTIARY OLEFINS

Isobutylene is the most available of the tertiary olefins utilizable in the reaction of this invention. However, any tertiary olefin containing up to 10 carbon atoms having the formula (II)

under the notation above, may be used. Suitable tertiary olefins will thus be seen to include isobutylene (already mentioned), diisobutylene, 2-methylbutene-1, 2-methylbutene-2, 2-methylpentene-1, 2-methylpentene-2, 3-methylpentene-2, 2,3-dimethylbutene-1, 2,3-dimethylbutene-2, 2-methylhexene-1, 2-methylhexene-2, 2,3-dimethylpentene-1, 2,4,4-trimethylpentene-1, 2,4,4-trimethylpentene-2, 2,4,4-trimethylhexene-1, 1-methylcyclohexene, and the like.

THE REACTION PROCEDURE AND CONDITIONS

The reaction is conveniently carried out by mixing together the urea, oleum or sulfuric acid and sulfur dioxide. The temperature is then adjusted, if necessary, to temperatures in the range $-40°$ to $+5°$ C., and kept in this range during the reaction to follow. Next the tertiary olefin is added, either as a liquid or as a gas, and thoroughly intermingled with the reaction mass by agitation. Because of the tendency of the tertiary olefins to polymerize under the reaction conditions, they should preferably be added in increments at about the rate at which they are consumed by the alkylation reaction. Since the urea and/or N-alkylurea are the more expensive materials, and since it is usually desired to maximize production of the N,N'-alkylureas, the supply of tertiary olefins is preferably kept up until the acceptance thereof into the reaction falls to an uneconomic low rate. Generally, a reaction time of 0.5–2.5 hours will suffice. The reaction conditions are then terminated, and the alkylated ureas recovered by any suitable means from the reaction mass. For instance, if the reaction mass is diluted with water, the N,N'-alkylureas will be precipitated and may be recovered by filtration. The acid filtrate will contain the N-alkylated ureas containing alkyl groups on only one of the nitrogen atoms; these may be precipitated by making the solution alkaline. The isobutylene polymers entrained with these precipitates may be removed therefrom by washing with petroleum ether or similar solvents.

At the end of the reaction, it is preferable to remove or otherwise inactivate the sulfur dioxide before allowing the temperature of the reaction mass to rise above $+5°$ C., as dealkylation may occur in the presence of sulfur dioxide at higher temperatures. The sulfur dioxide can be simply stripped off by applying vacuum and recovered by condensation in suitable cold receivers. However, it has been discovered by an associate of the present patentees that if a small amount of water (75–250 grams per mole of the urea) is added to the reaction mass, the mass separates into a lower layer containing the acid, sulfur dioxide and alkylated ureas and an upper layer of isoolefin polymer. Both layers have greatly improved fluidity, and the urea is not dealkylated in such mixtures when the temperature rises to normal values. The sulfur dioxide may be removed from the mass by distillation under vacuum at temperatures on the order of 35° C., and the isoolefin polymer may be decanted, both of which operations are greatly facilitated by the improved fluidity of the mass. The N,N'-alkylated ureas may be recovered from the acid layer by diluting with sufficient water to effect precipitation thereof, followed by filtration. The N-alkylated ureas in the filtrate may be precipitated by alkalization of the filtrate.

With the foregoing general discussion in mind, there are given herewith detailed examples of the practice of this invention. All parts and percentages are by weight unless otherwise indicated.

EXAMPLES

|  | Grams | Moles |
|---|---|---|
| Urea | 30 | 0.5 |
| Sulfuric acid or oleum (concentration per Table II) | ---------- | [1] 0.6–1.294 |
| Sulfur dioxide | [1] 20–120 | .31–1.88 |

[1] Per table II.

A series of runs was made in accordance with the foregoing schedule varying the proportions of the constituents of the reaction medium in the successive runs as indicated in Table II. The runs were carried out in a 500 ml. three-necked flask, fitted with a thermometer, stirrer, and sparger for introduction of isobutylene into the reaction mass. A Dry Ice-acetone bath was provided for cooling the flask. In each run, the sulfuric acid or oleum was charged first and stirring commenced and maintained throughout the subsequent operations. Next the urea was added and dissolved in the acid at 15–25° C. When the addition of urea was near completion, the temperature was allowed to rise to 25–35° C. and the mixture stirred several minutes to insure complete solution. The solution was then cooled to $-15°$ C., and the sulfur dioxide added in liquid form.

The temperature of the mass was then adjusted to the temperature selected for the run, and isobutylene injected through the sparger at the maximum rate possible while maintaining the temperature at the value chosen for the run. When the reaction ceased to take up isobutylene, injection of the isobutylene was discontinued, and 75 grams of water were added to the reaction mass. The mixture was then warmed to 35° C. under a vacuum of 1–2 inches of mercury, and the sulfur dioxide distilled off at this temperature under a 100 mm. absolute pressure. The reaction mixture was then removed from the flask, and the supernatant liquid isobutylene polymer removed by decantation. The reaction mixture was then poured into ice water, and the N,N'-di-t-butylurea separated by filtration and washed on the filter successively with water and petroleum ether. The filtrate was made alkaline with ammonium hydroxide, whereby the N-t-butylurea was precipitated and recovered by filtration. The reaction conditions, and yields of N-t-butylurea and N,N'-di-t-butylurea are set forth in Table II.

Table II

| Run No. | Moles H₂SO₄ | H₂SO₄ conc., percent | SO₂ added (g.) | Alkylation time, hrs. | Alkylation temp., °C. | Yield t-butylurea, percent | Yield di-t-butylurea, percent | N utilization, percent |
|---|---|---|---|---|---|---|---|---|
| 1 | 0.6 | 100 | 70 | 3.0 | −35±5 | | 25.8 | 25.8 |
| 2 | 0.8 | 100 | 65 | 2.5 | −20±5 | | 30.9 | 30.9 |
| 3 | 1.0 | 100 | 70 | 2.0 | −20±5 | 28.0 | 62.6 | 76.6 |
| 4 | 1.2 | 100 | 70 | 1.0 | −20±5 | 75.3 | 16.5 | 54.1 |
| 5 | 1.2 | 96 | 70 | 1.0 | −20±5 | 63.1 | 45.1 | 76.7 |
| 6 | 1.0 | 96 | 70 | 2.0 | −15±5 | 34.6 | 64.8 | 82.1 |
| 7 | 0.9 | 96 | 70 | 2.0 | −20±5 | 23.3 | 31.4 | 43.0 |
| 8 | 1.2 | 90 | 70 | 1.5 | −20±5 | 22.6 | 15.6 | 26.9 |
| 9 | 1.0 | 96 | 20 | 1.0 | −15±5 | 51.2 | 31.5 | 68.2 |
| 10 | 1.0 | 96 | 40 | 0.75 | −15±5 | 31.1 | 39.3 | 55.8 |
| 11 | 1.0 | 96 | 70 | 1.5 | −15±5 | 30.0 | 53.3 | 68.3 |
| 12 | 1.0 | 96 | 75 | 1.5 | −15±5 | 34.1 | 56.6 | 73.6 |
| 13 | 1.0 | 96 | 85 | 1.5 | −15±5 | 38.6 | 49.5 | 68.8 |
| 14 | 1.0 | 96 | 90 | 1.5 | −15±5 | 37.1 | 65.6 | 84.1 |
| 15 | 1.0 | 96 | 100 | 1.5 | −15±5 | | 48.8 | 48.8 |
| 16 | 1.0 | 96 | 120 | 1.5 | −15±5 | 35.3 | 30.9 | 48.5 |
| 17 | 1.0 | 96 | 65 | 1.25 | −15±5 | 33.3 | 57.2 | 76.0 |
| 18 | 1.0 | 96 | 65 | 1.5 | −10±5 | 23.9 | 41.0 | 52.9 |
| 19 | 1.0 | 96 | 65 | 1.25 | −20±5 | 28.2 | 52.0 | 66.1 |
| 20 | 1.0 | 96 | 65 | 1.5 | −30±5 | 22.8 | 4.2 | 15.6 |
| 21 | 0.900 | 96 | 80 | 1.5 | −20±5 | 25.5 | 10.3 | 24.3 |
| 22 | 1.0 | 96 | 80 | 1.5 | −20±5 | 24.8 | 48.2 | 60.6 |
| 23 | 1.039 | 96 | 80 | 2.0 | −20±5 | 30.9 | 57.0 | 72.4 |
| 24 | 1.098 | 96 | 80 | 2.0 | −20±5 | 32.4 | 64.3 | 80.5 |
| 25 | 1.157 | 96 | 80 | 1.5 | −20±5 | 54.3 | 56.4 | 83.5 |
| 26 | 1.215 | 96 | 80 | 1.5 | −20±5 | 38.9 | 72.9 | 92.3 |
| 27 | 1.294 | 96 | 80 | 1.5 | −20±5 | 44.4 | 68.3 | 90.5 |
| 28 | 1.0 | 99 | 80 | 1.5 | −20±5 | 28.8 | 67.0 | 81.4 |
| 29 | 1.0 | 98 | 80 | 2.0 | −20±5 | 26.2 | 72.1 | 85.2 |
| 30 | 1.0 | 97 | 80 | 2.0 | −20±5 | 31.4 | 61.9 | 77.6 |
| 31 | 1.117 | 100 | 82.1 | 2.0 | −20±5 | 64.1 | 53.4 | 85.4 |
| 32 | 1.117 | 100 | 101.1 | 1.5 | −20±5 | 66.5 | 27.9 | 81.1 |
| 33 | 1.05 | 100 | 81.3 | 1.75 | −20±5 | 26.2 | 77.6 | 91.8 |
| 34 | 1.025 | 100 | 80 | 2.0 | −20±5 | 27.2 | 74.8 | 88.4 |
| 35 | 1.0 | 100 | 80 | 1.5 | −20±5 | 34.1 | 68.6 | 85.6 |
| 36 | 1.046 | ¹1.96 | 80 | 1.5 | −20±5 | 25.8 | 64.4 | 77.3 |
| 37 | 1.005 | ¹1.96 | 80 | 2.0 | −20±5 | 25.3 | 77.5 | 90.1 |
| 38 | 0.974 | ¹1.96 | 80 | 2.0 | −20±5 | 27.6 | 69.9 | 83.7 |
| 39 | 0.921 | ¹1.96 | 80 | 2.0 | −20±5 | 23.4 | 46.2 | 57.9 |

¹ The acid supplied in these experiments was oleum of 1.96% SO₃ concentration.
"Moles H₂SO₄" is calculated as the sum of the moles of H₂SO₄ plus moles of SO₃ used.

From the foregoing general discussion and detailed specific examples, it will be evident that this invention provides a novel and highly efficient process for the alkylation of ureas. The sulfuric acid (or oleum) and sulfur dioxide employed are cheap and readily available, and the sulfur dioxide can be largely recovered from the process. The process gives excellent and consistent yields, and is readily manageable, since the reaction masses remain at all times homogeneous and reasonably fluid. The process can be carried out without difficulty, in simple equipment, and with only a minimum of skilled attendance.

This application is a continuation-in-part of the applicants' earlier application Serial No. 507,718, filed May 11, 1955.

What is claimed is:

1. The process which comprises contacting, at temperatures in the range −40° to +5° C., (I) a tertiary olefin containing up to 10 carbon atoms with (II) a reaction mass containing

|   | Moles |
|---|---|
| (A) A urea | 1 |
| (B) A substance selected from the group consisting of sulfuric acid and oleum | 1–3 |
| and |   |
| (C) Sulfur dioxide | 0.5–4.0 | said urea (A) being selected from the group consisting of urea itself, mono-N-alkyl ureas in which the alkyl groups contain 1–10 carbon atoms, and di-N-alkyl ureas in which both alkyl groups are on one of the nitrogen atoms and contain 1–10 carbon atoms and said selected substance (B) ranging in composition from 80% sulfuric acid to 60% oleum, the reaction yielding mono-N-alkylated and di-N,N'-alkylated ureas in those cases where urea itself is selected, and yielding N,N'-alkylated ureas in those cases in which alkyl ureas are selected.

2. The process which comprises contacting, at temperatures in the range −40° to +5° C., (I) isobutylene with (II) a reaction mass containing

|   | Moles |
|---|---|
| (A) Urea | 1 |
| (B) A substance selected from the group consisting of sulfuric acid and oleum | 1–3 |
| and |   |
| (C) Sulfur dioxide | 0.5–4.0 | said selected substance (B) ranging in composition from 80% sulfuric acid to 60% oleum, the reaction yielding mono-N-t-butyl urea and di-t-butyl urea.

3. The process which comprises contacting, at temperatures in the range −40° to +5° C., (I) isobutylene with (II) a reaction mass containing

|   | Moles |
|---|---|
| (A) Urea | 1 |
| (B) A substance selected from the group consisting of sulfuric acid and oleum | 2.0–2.5 |
| and |   |
| (C) Sulfur dioxide | 1.1–1.6 | said selected substance (B) ranging in composition from 80% sulfuric acid to 60% oleum, the reaction yielding mono-N-t-butyl urea and di-t-butyl urea.

4. The process which comprises contacting, at temperatures in the range −40° to +5° C., (I) isobutylene with (II) a reaction mass containing

|   | Moles |
|---|---|
| (A) Urea | 1 |
| (B) A substance selected from the group consisting of sulfuric acid and oleum | 2.0–2.5 |
| and |   |
| (C) Sulfur dioxide | 0.5–4.0 | said selected substance (B) ranging in composition from 80% sulfuric acid to 60% oleum, the reaction yielding mono-N-t-butyl urea and di-t-butyl urea.

No references cited.

UNITED STATES PATENT OFFICE
CERTIFICATE OF CORRECTION

Patent No. 2,849,488                August 26, 1958

Joseph C. Ambelang et al.

It is hereby certified that error appears in the above numbered patent requiring correction and that the said Letters Patent should read as corrected below.

Column 5 and 6, in "Table II" second column of the heading for "Holes $H_2SO_4$" read -- Moles $H_2SO_4$ --.

Signed and sealed this 5th day of June 1962.

(SEAL)
Attest:

ERNEST W. SWIDER
Attesting Officer

DAVID L. LADD
Commissioner of Patents